United States Patent [19]

Metcalf

[11] Patent Number: 5,214,679
[45] Date of Patent: May 25, 1993

[54] SCORE KEEPER AND DISTANCE INDICATOR FOR USE WITH A GOLF CART

[75] Inventor: Robert G. Metcalf, 19 W. 266 Governors Trail, Oak Brook, Ill. 60521

[73] Assignee: Robert G. Metcalf, Downers Grove, Ill.

[21] Appl. No.: 714,857

[22] Filed: Jun. 13, 1991

[51] Int. Cl.[5] .................. G06F 15/44; G01C 22/00
[52] U.S. Cl. ................................. 377/5; 377/24.2; 377/24.1; 273/32 R; 434/252
[58] Field of Search ................ 377/5, 24.1, 24.2; 273/32 R, 32 H, 176 R; 434/252

[56] References Cited

U.S. PATENT DOCUMENTS

| | | | |
|---|---|---|---|
| 3,805,411 | 4/1974 | Andrews | 434/252 |
| 4,266,214 | 5/1981 | Peters | 377/5 |
| 4,367,526 | 1/1983 | McGeary et al. | 377/5 |
| 4,480,310 | 10/1984 | Alverez | 377/24.2 |
| 4,547,781 | 10/1985 | Gelhorn et al. | 377/24.1 |
| 4,815,020 | 3/1989 | Cormier | 273/32 H |
| 4,887,281 | 12/1989 | Swanson | 377/24.1 |

Primary Examiner—John S. Heyman
Attorney, Agent, or Firm—McAndrews, Held & Malloy, Ltd.

[57] ABSTRACT

A scorekeeper and distance indicator for use with a golf cart measures distance traversed by the golf cart and uses the measured distance in conjunction with stored information about a hole being played to determine the remaining distance to the pin. The apparatus displays the remaining distance, the number of the hole being played and a cumulative score. The apparatus is adaptable to store scores and other information for a plurality of players. A portion of the apparatus that includes a memory device can be removed from the golf cart and taken to a remote location to read or print scores. The increasing use of golf carts, and especially of powered golf carts, makes it feasible to use an odometer to measure the distance traversed by the golf cart. The availability of inexpensive microprocessor chips makes it feasible to combine information from an odometer or the like about measured distances with stored information about the characteristics of a golf course. This enables a user such as a golfer to determine and display the distance to the pin from a particular lie, and thus to remove some guesswork from the game. It is also possible to enter current score information into a memory that is associated with a microprocessor to provide a score that can be read out at the end of a round or any other desired time.

2 Claims, 3 Drawing Sheets

SCORE KEEPER AND DISTANCE INDICATOR FOR USE WITH A GOLF CART

BACKGROUND OF THE INVENTION

This invention is related to an apparatus for gathering, storing, and displaying information that will assist a golfer in playing the game of golf.

Golfers are typically assisted in planning play and in keeping score by the use of a scorecard which lists the yardage, par value, and the handicap for each hole in a golf course and also provides a place for the golfer to enter the number of strokes taken in a hole by each player in a group after play of the hole is completed. Some players add to this a separate tally of the number of putts required on each hole, but the typical scorecard is not designed to record this information.

After a golfer has teed off, he or she will need to estimate the remaining distance to the pin. This distance is an important factor in club selection. Improper club selection for a particular distance may cause a golfer to overshoot or undershoot the green. Some scorecards add to the items listed above a map of the course that may indicate doglegs, water hazards, bunkers, and areas that are out of bounds. However, if the golfer is not at the tee or the green, the scorecard cannot tell him where he is and how far he has to go to reach the pin.

It would thus be useful for a golfer to have a way of determining the distance from a present lie to the pin. However, after teeing off, a golfer can only make a visual estimate of that distance, sometimes assisted by fixed distance markers. For example, it is common to plant a tree or place some other recognizable marker 150 yards from a measuring point on the green. Such a fixed marker is not changed for different pin placements, and it is only a matter of coincidence when a golfer's lie is near the distance marker.

SUMMARY OF THE INVENTION

It is an object of the present invention to provide an apparatus for determining an displaying the distance from a present lie to the pin for a golfer playing a particular hole on a golf course.

It is another object of the present invention to provide an apparatus for determining and displaying golf scores during and after the play of a round of golf.

It is another object of the present invention to provide an apparatus that will accumulate scores during a round of golf and that can be removed to a remote location to enable a printout or other recovery of scores for the round.

It is another object of the present invention to provide information to help a golfer to select a club in response to the present position of the ball, the current location of tee markers, and the current pin placement.

It is another object of the present invention to store and process information about ball location, elevations, hazards, wind, and other factors that influence club selection in the play of a game of golf.

It is another object of the present invention to provide a recommended club selection to a golfer based upon the application of information about a present location of a ball and also upon stored information about the hole that is being played.

These and other objects will become apparent in the course of a detailed description of the invention. In one embodiment of the invention, a scorekeeper and distance indicator for use with a golf cart stores information about a golf course or about a plurality of golf courses, including the distance for each hole. Other information that may be stored includes current pin placement, current placement of tee markers, relative changes in elevation, locations of hazards, and the like. An odometer is operated by a golf cart to measure distance from a starting point such as the tee or any other starting point chosen by the golfer. This distance is taken as an input to a computing device that determines and displays the remaining distance to the pin. The computing device records and displays scores of one or more players and may also record and display the number of putts taken on each hole, the yardage obtained on each stroke, and the like. Accumulated information can be stored in the device and can be read out and printed out as desired. The computing device may be removed from the golf cart and taken to a remote location to print scores, the accumulated information, and any results that it may have calculated. The computing device may also be adapted to respond to an input reflecting the skill of a player to provide further help in the selection of a club for a particular shot.

DETAILED DESCRIPTION OF THE PREFERRED EMBODIMENT

Figure 1:
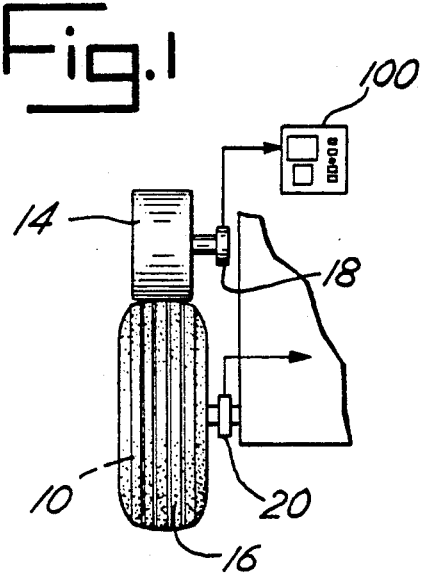
FIG. 1 is a symbolic representation of the wheel of a golf cart or the like as it is adapted for use with an embodiment of the present invention.

FIG. 1 is a symbolic representation of the wheel of a golf cart 8 or the like as it is adapted for use with an embodiment of the present invention. In FIG. 1, a wheel 10 represents one of the wheels of the golf cart 8. The golf cart 8 may either be powered or it may be one that is pulled manually on the course. A measuring wheel 14 is placed in contact with the tire 16 of the wheel 10 to be driven when the wheel 10 rotates. A transducer 18 is driven by the measuring wheel 14 to provide an output that is a function of the distance traveled by the wheel 10. In the alternative, a transducer 20 may be connected to the axle 12 of the wheel 10 to provide such a signal. The outputs of the transducers 18 and 20 are thus equivalent to odometer signals, providing a measure of distance or incremental distance traveled by the golf cart 8 with which the wheel 10 is associated. An odometer is a well-known instrument for measuring the distance traveled, as by a vehicle. It should be evident that the measuring wheel 14 could also be placed directly on the ground and driven by motion of the golf cart 8 as the golf cart 8 is moved on the course.

Figure 2:
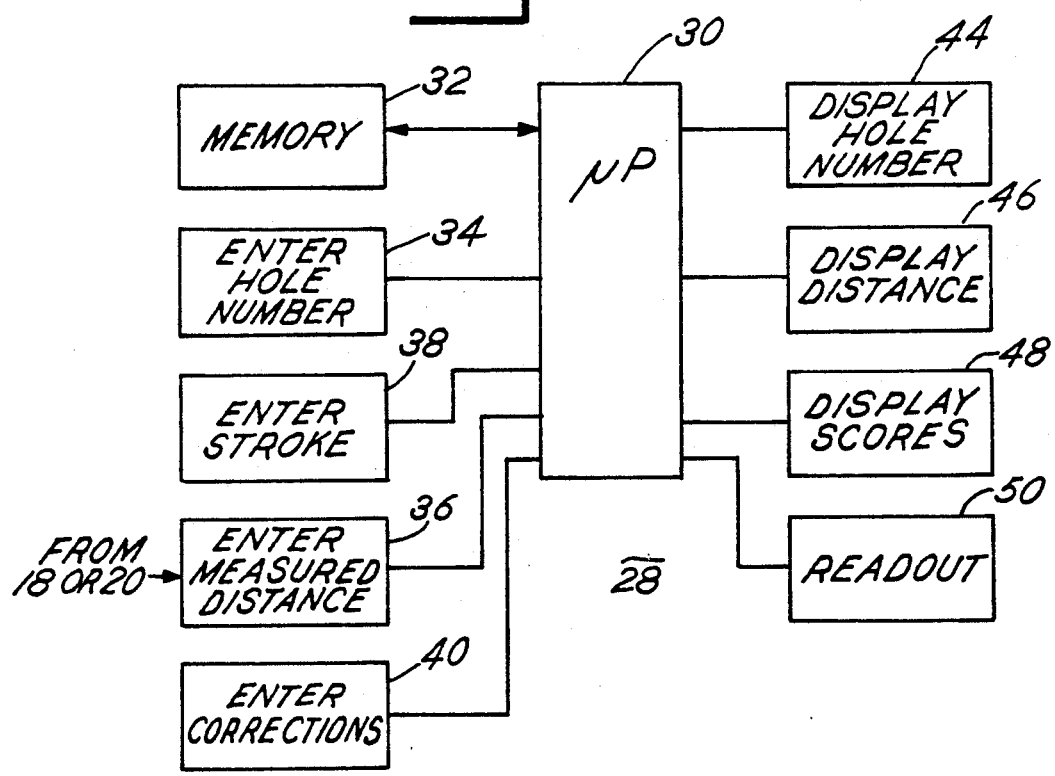
FIG. 2 is a block diagram of a microcomputer for use with an embodiment of the present invention.

FIG. 2 is a block diagram of a microcomputer for the practice of the present invention. In FIG. 2, a microprocessor 30 is connected to a memory 32 to supply information to the memory 32 and to receive information from the memory 32. An input device 34 allows a user to enter the number of the hole on the golf course that is about to be played. The input device 34 may be a key pad, a rotary switch, or the like. An input device 36 receives the signal produced by one of the transducers 18 or 20 and converts that signal for input to the microprocessor 30. This represents an entry of the distance measured as the user has moved the golf cart from the tee to the location of his or her golf ball. An input device 38, which may be a switch or a particular signal from the key pad or the like that comprises the input device 34, provides a signal by which to count a stroke and also denotes arrival of the golfer at the lie of the ball. An input device 40, which also may be a switch, a key pad, or the same key pad or the like used with the input device 34, allows the golfer to enter information about factors such as the golfer's skill level, wind direction, pin placement, tee placement, and other factors that may influence the selection of a club to hit a particular distance that is determined by the apparatus of the present invention. The input device 40 also allows the golfer to identify the particular player whose score is being kept when the apparatus of the present invention is used to keep score for more than one player.

The microprocessor 30 of FIG. 2, in association with information stored in the memory 32 and supplied by the input devices 34–40, will determine information that is displayed as follows. A display 44 lists the number of the hole that is currently being played and a display 46 displays the current distance to the pin. In normal operation, on arriving at each tee the user will place the golf cart 8 at the tee and will enter information into the keypad 34 to identify the hole that is about to be played. The distance for that hole will be recalled from the memory 32 and displayed on the display 46, corrected if necessary for pin and tee placement on a particular day. After the user hits the ball and proceeds down the fairway, the distance that is displayed on the display 46 is reduced by the distance traveled by the golf cart 8. If the cart is confined by course rules to a special path, it will probably not be necessary to correct the specific distance for movement of the golf cart 8 across the fairway. If a powered golf cart 8 is permitted to range over the fairway or if the golfer is pulling a cart manually, a correction for transverse movement can be entered at the input device 40 so that the distance displayed on a display 46 is determined with adequate accuracy. This will typically be a signal disabling the measurement while the golfer is crossing the fairway.

In FIG. 2, a display 48 shows an accumulated score. This may be for a single player or for as many as a foursome. If scores for two or more players are to be displayed, it will be necessary to identify the player for whom a stroke is being entered on the input device 38. All of the information displayed on the displays 44, 46, 48, and 50, along with any other stored or calculated information as desired, can also be printed or otherwise presented for use on readout device 52, which may be a printed, video display, or the like.

Figure 3:
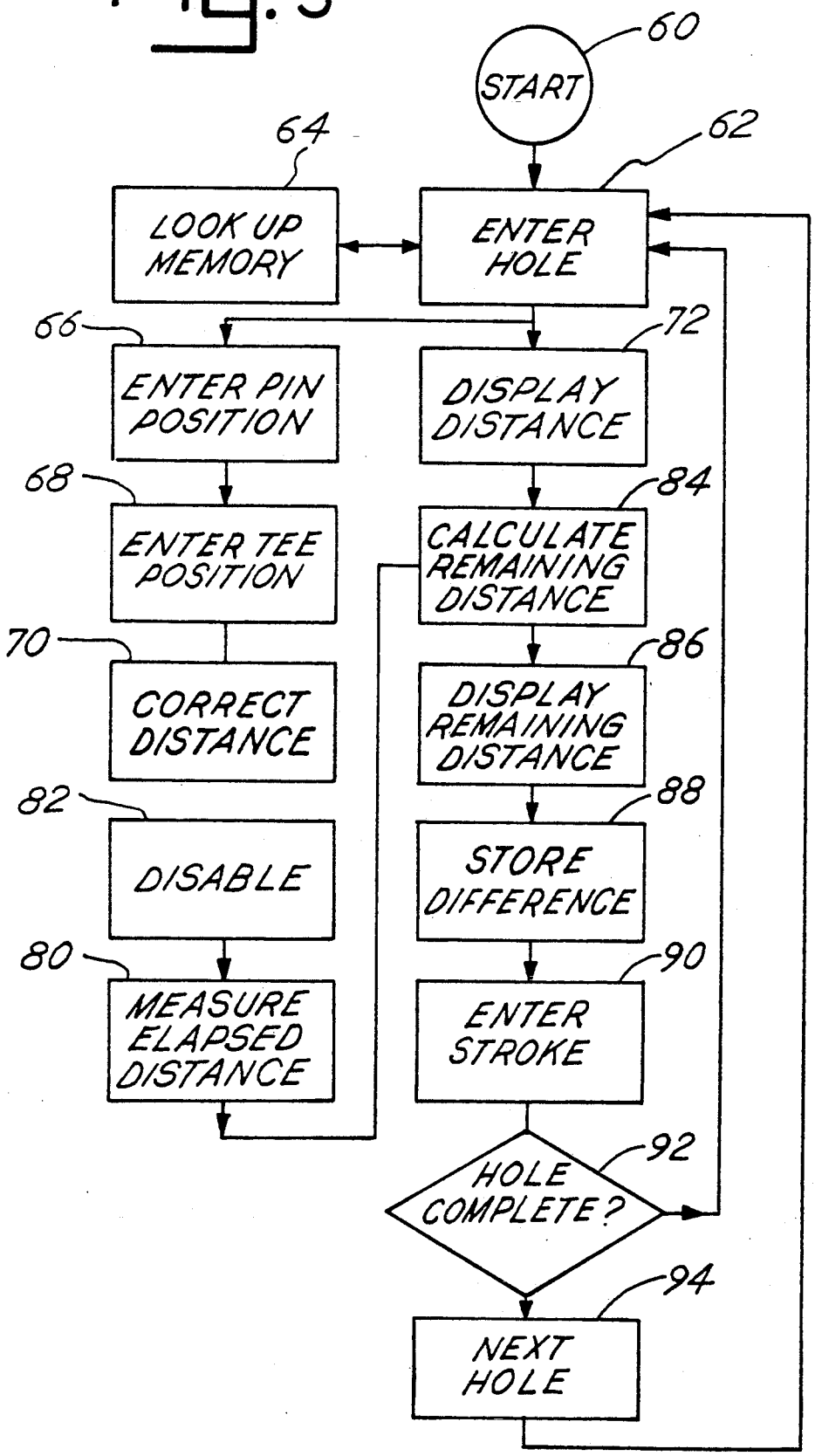
FIG. 3 is a flow chart of the operation of the microcomputer of the block diagram of FIG. 2.

FIG. 3 is a flow chart of the operation of the circuit of FIG. 2. In FIG. 3, after an initializing instruction 60 directs the setting of appropriate initial conditions, a block 62 calls for the entry of the number of the hole that is to be played. A block 64 addresses memory to call the distance to the hole selected. A block 66 calls for the user to enter the pin position, if desired. This enables the user to correct the stored distance for different placements of the pin. This could also be done automatically, as by a single set of entries stored at the start of a round. A block 68 calls for the user to enter the tee position, which also may be changed periodically by groundskeepers. Based upon these entries, a block 70 directs the generation of a correction to the distance for the hole that was recalled from memory by the block 64. If no entry is made in response to the blocks 66 and 68, the stored distance to the hole that is obtained from memory is unchanged. In either case, the distance obtained in response to the block 70 is displayed in response to a direction from the block 72.

As the golfer proceeds down the course in a golf cart 8 equipped with the apparatus described here, a block 80 in FIG. 3 calls for a measure of the distance covered by the golf cart 8. If the user goes across the fairway in a direction substantially transverse to a line toward the pin, he can call a block 82 to disable the distance measurement during the transverse movement. An output from the block 80 is taken to a block 84 which directs a calculation of the distance remaining on the hole, which is displayed in response to a command from the block 86. The difference in distances may be stored in response to a signal from a block 88 which would thus indicate the length of a drive. Whether or not this function is performed, the system counts a stroke to be scored in response to an input from a block 90 which directs the entry of a signal indicating that a stroke has been taken. A decision block 92 then tests to see if the hole is complete. If it is not, control returns to the block 84 to calculate remaining distance. If the hole is complete, a block 94 calls for the entry of information about the next hole to be played, and control returns to the block 62.

Figure 4:
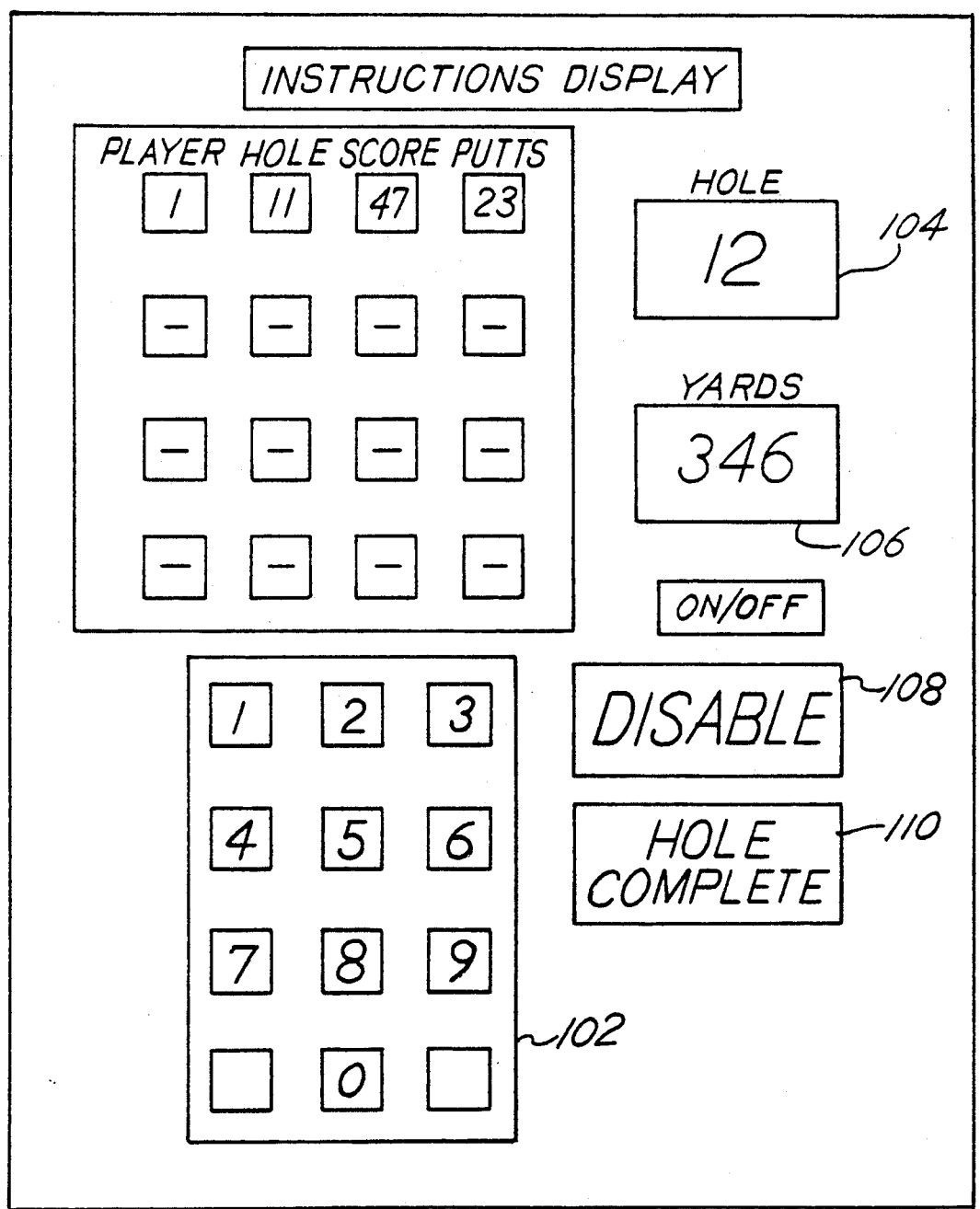
FIG. 4 is a display for use with the microcomputer of FIG. 2.

FIG. 4 is a display for use with the microcomputer of FIG. 2. In the preferred embodiment, the display of FIG. 4, along with an electronic embodiment of the block diagram of FIG. 2, is in a box 100 which can be attached to a convenient location on a golf cart 8 and also removed to be taken to a remote location for printing scores, changing a battery or batteries which will typically power the device, entering revised course information, and the like. In FIG. 4, a key pad 102 provides a means of entering information. The key pad 102 is shown as a numerical key pad, but it should be evident that an alphanumerical key pad such as a telephone key pad could be used to enter alphabetical and numerical information. A display 104, typically a liquid crystal display or the like, shows the hole that is next up or currently being played, and a display 106 shows the distance in yards from the green or the pin. Numbers in the display 106 will decrease in amount as the player drives the golf cart 8 toward the green. A push button 108 disables the accumulation of yardage as the golfer drives the cart across the green or in a direction that is not toward the pin. A push button 110 resets the device when the golf cart 8 is placed at the tee to start a new hole. It should be evident that any information that has been stored in the memory 32 of FIG. 2 can be called for examination at any time. This includes, but is not limited to, numbers of putts on a particular hole or holes, distances of drives, number of holes parred, birdied, and bogeyed, and other useful accumulations of information that are otherwise difficult to account for while playing a round of golf.

The preceding description is intended to be illustrative and not limiting. The scope of the invention extends to the breadth of the appended claims and their equivalents.

I claim:

1. An apparatus attachable to a golf cart for determining the distance from a present location to a pin on a golf course and for determining and displaying a golfer's score comprising in combination:

(a) means for identifying a hole that is being played;
(b) means for measuring distance traversed by the golfer with the golf cart on the identified hole to a present location;
(c) means for determining a distance from the present location of the golf cart to the pin;
(d) means for displaying the distance from the present location to the pin;
(e) means for accumulating a current score for each of a plurality of players consisting of a count of strokes taken by each of the players;
(f) means for simultaneously displaying the current scores of said plurality of players; and
(g) means for removing the apparatus from the golf cart to allow the apparatus to be taken to a remote location for recovery of the scores.

2. An apparatus to be connected to a wheel of a golf cart to store information about each of a plurality of holes on a golf course, measure distance traversed by the golf cart and display information for a golfer about distance remaining to be played on a hole and about scores and number of putts made by each of a plurality of golfers, the apparatus comprising:

(a) a measuring wheel connected to measure distance traversed by a golf cart;
(b) a transducer connected to the measuring wheel to produce an electrical signal corresponding to the distance traversed by the golf cart;
(c) a microprocessor connected to the transducer to receive and process the signal to provide a signal corresponding to distance traversed on the hole;
(d) a memory connected to the microprocessor to receive information from the microprocessor and supply information to the microprocessor abut total distance of the hole;
(e) an input device connected to the microprocessor to convert manual entry of information about scores and putts for the plurality of golfers into a form capable of entry into the microprocessor and to enter that information into the microprocessor; and
(f) a display device connected to the microprocessor to simultaneously display selected information of said plurality of golfers under control of the microprocessor.

* * * * *